US012233620B2

(12) United States Patent
Sunamoto et al.

(10) Patent No.: US 12,233,620 B2
(45) Date of Patent: Feb. 25, 2025

(54) THERMOPLASTIC LIQUID CRYSTAL POLYMER MOLDED BODY AND METHOD FOR MANUFACTURING SAME

(71) Applicant: KURARAY CO., LTD., Okayama (JP)

(72) Inventors: Tatsuya Sunamoto, Tokyo (JP); Shinji Hiramatsu, Kamisu (JP); Minoru Onodera, Kurashiki (JP)

(73) Assignee: KURARAY CO., LTD., Okayama (JP)

( * ) Notice: Subject to any disclaimer, the term of this patent is extended or adjusted under 35 U.S.C. 154(b) by 964 days.

(21) Appl. No.: 17/059,775

(22) PCT Filed: May 27, 2019

(86) PCT No.: PCT/JP2019/020968
§ 371 (c)(1),
(2) Date: Feb. 1, 2021

(87) PCT Pub. No.: WO2019/230672
PCT Pub. Date: Dec. 5, 2019

(65) Prior Publication Data
US 2021/0197527 A1    Jul. 1, 2021

(30) Foreign Application Priority Data

Jun. 1, 2018  (JP) ................................ 2018-106076

(51) Int. Cl.
| | | |
|---|---|---|
| *B32B 15/08* | (2006.01) | |
| *B32B 7/12* | (2006.01) | |
| *B32B 15/09* | (2006.01) | |
| *B32B 27/08* | (2006.01) | |
| *B32B 27/16* | (2006.01) | |
| *B32B 27/36* | (2006.01) | |
| *B32B 38/00* | (2006.01) | |
| *C08J 5/12* | (2006.01) | |
| *C08J 7/12* | (2006.01) | |
| *C09J 5/02* | (2006.01) | |

(52) U.S. Cl.
CPC ............... *B32B 15/08* (2013.01); *B32B 7/12* (2013.01); *B32B 15/09* (2013.01); *B32B 27/08* (2013.01); *B32B 27/16* (2013.01); *B32B 27/36* (2013.01); *B32B 38/0008* (2013.01); *C08J 5/12* (2013.01); *C08J 7/123* (2013.01); *C09J 5/02* (2013.01); *B32B 2307/204* (2013.01); *B32B 2457/08* (2013.01); *C08J 2367/04* (2013.01)

(58) Field of Classification Search
CPC ......... B32B 27/36; B32B 15/08; B32B 15/09; B32B 27/08; B32B 7/12; B32B 27/16; B32B 38/0008; C08J 5/12; C08J 7/123
See application file for complete search history.

(56) References Cited

U.S. PATENT DOCUMENTS

| | | | |
|---|---|---|---|
| 9,439,303 B2 | 9/2016 | Onodera et al. | |
| 2004/0091688 A1* | 5/2004 | Gaku | B32B 27/08 |
| | | | 428/209 |
| 2013/0252019 A1 | 9/2013 | Sakaguchi et al. | |
| 2014/0023881 A1 | 1/2014 | Sakaguchi et al. | |
| 2015/0195921 A1 | 7/2015 | Onodera et al. | |
| 2016/0236402 A1 | 8/2016 | Nakashima et al. | |
| 2020/0329558 A1* | 10/2020 | Kasai | H05K 1/036 |

FOREIGN PATENT DOCUMENTS

| | | |
|---|---|---|
| CN | 103402757 A | 11/2013 |
| CN | 105683266 A | 6/2016 |
| CN | 107849429 A | 3/2018 |
| JP | H1216824 A | 8/1989 |
| JP | H1236246 A | 9/1989 |
| JP | 200149002 A | 2/2001 |
| JP | 200482554 A | 3/2004 |
| JP | 2005297405 A | 10/2005 |
| JP | 200763306 A | 3/2007 |
| JP | 2007284515 A | 11/2007 |
| JP | 2007302740 A | 11/2007 |
| JP | 2008103559 A | 5/2008 |
| JP | 201013671 A | 1/2010 |

(Continued)

OTHER PUBLICATIONS

Ge, Surface Modification of a Liquid-Crystalline Polymer for Copper Metallization, 2002, Journal of Polymer Science: Part B: Polymer Physics, vol. 41, pp. 623-636. (Year: 2002).*

Inagaki, Plasma Surface Modification of Aromatic Polyester (Vecstar OC®) Films for Copper Metallization—Dynamic Surface Properties of Plasma-Modified Vecstar OC Films, 2009, Polymer Surface Modification: Relevance to Adhesion, vol. 5, pp. 19-43. (Year: 2009).*

Miyauchi, A study of adhesive improvement of a Cr—Ni alloy layer on a liquid crystal polymer (LCP) surface, 2016, Progress in Organic Coatings 94, pp. 73-78. (Year: 2016).*

Kurihara, Improvement of Adhesion and Long-Term Adhesive Reliability of Liquid Crystalline Polyester Film by Plasma Treatment, 2007, Journal of Applied Polymer Science, vol. 108, pp. 85-92. (Year: 2008).*

(Continued)

*Primary Examiner* — Monique R Jackson
(74) *Attorney, Agent, or Firm* — HAUPTMAN HAM, LLP

(57) ABSTRACT

A thermoplastic liquid crystal polymer (TLCP) molded body including a thermoplastic polymer capable of forming an optically anisotropic melt phase. The TLCP molded body includes an adherend portion in at least a part of the TLCP molded body. The adherend portion has a surface satisfying: a ratio <C—O>/<COO> of 1.5 or greater in which the <C—O> represents a proportion of a peak area of [C—O bond] to a C(1s) peak area, and the <COO> represents a proportion of a peak area of [COO bond] based on the C(1s) peak area; and a ratio <C=O>/<COO> of 0.10 or higher in which the <C=O> represents a proportion of a peak area of [C=O bond] based on the C(1s) peak area, and the <COO> represents the proportion of the peak area of the [COO bond] based on the C(1s) peak area in a result of X-ray photoelectron spectroscopy analysis.

18 Claims, No Drawings

(56) References Cited

FOREIGN PATENT DOCUMENTS

| | | |
|---|---|---|
| JP | 4892274 B | 12/2011 |
| KR | 1020130126997 A | 11/2013 |
| TW | 201240803 A1 | 10/2012 |
| TW | 201527366 A | 7/2015 |
| TW | 201715002 A | 5/2017 |
| WO | 2012093606 A1 | 7/2012 |
| WO | 2012117850 A1 | 9/2012 |
| WO | 2014046014 A1 | 3/2014 |
| WO | 2015064437 A1 | 5/2015 |
| WO | 2016031342 A1 | 3/2016 |
| WO | 2017029917 A1 | 2/2017 |

OTHER PUBLICATIONS

International Preliminary Report on Patentability in PCT Application No. PCT/JP2019/020968, mailed Dec. 10, 2020, 15pp.

\* cited by examiner

THERMOPLASTIC LIQUID CRYSTAL POLYMER MOLDED BODY AND METHOD FOR MANUFACTURING SAME

RELATED APPLICATIONS

The present application is a National Phase of International Application No. PCT/JP2019/020968 filed May 27, 2019, which claims priority to Japanese Application No. 2018-106076, filed Jun. 1, 2018, the entire disclosures of which are herein incorporated by reference as a part of this application.

BACKGROUND OF THE INVENTION

Field of the Invention

The present invention relates to a molded body of a thermoplastic polymer capable of forming an optically anisotropic melt phase (hereinafter, referred to as thermoplastic liquid crystal polymer or TLCP), the molded body having an excellent adhesion property as well as to a method for manufacturing the same.

Description of Related Art

Since TLCP molded bodies have low dielectric characteristics (low dielectric constant and low dielectric dissipation factor) due to the nature of thermoplastic liquid crystal polymers, they have been attracting attention in applications in which dielectric characteristics are regarded as of higher importance.

For example, in recent years, with accelerated signal transmission in printed wiring boards, signals having higher frequencies are increasingly used. As a consequence, substrates for printed wiring boards are required to have excellent dielectric characteristics (low dielectric constant, low dielectric dissipation factor) in high frequency regions. To meet such a requirement, thermoplastic liquid crystal polymer (TLCP) films having low dielectric characteristics have been drawing attention as substrate films for printed wiring boards, in place of conventional polyimide (PI) films and polyethylene terephthalate films. However, there is a problem that the thermoplastic liquid crystal polymer is originally poor in adhesion property.

For example, Patent Document 1 (JP Laid-open Patent Publication No. H1-216824) and Patent Document 2 (JP Laid-open Patent Publication No. H1-236246) disclose a surface treatment of ultraviolet radiation at a wavelength of 184.9 nm, as a surface modification method for subjecting a liquid crystal polymer molded body to be, for example, painted, printed, adhered, vacuum-evaporated, or plated.

Patent Document 3 (JP Patent No. 4892274) discloses a liquid crystal polymer molded body which includes an adherend portion having a surface part satisfying: a ratio of a sum of peak intensities of [—C—O— bond] and [—COO— bond] based on a C(1s) peak intensity of 21% or higher; and a ratio of the peak intensities ([—C—O— bond]/[—COO— bond]) of 1.5 or lower in a result of X-ray photoelectron spectroscopy analysis of the surface part. As a manufacturing method of such a molded body, Patent documents 3 also describes a method for producing a liquid crystal polymer molded body, the method including a step of irradiating plasma to at least the adherend portion of the liquid crystal polymer molded body so as to carry out surface treatment under acidic gas atmosphere in a condition of output of 0.6 W/cm² or lower and pressure of 0.1 Torr or higher. This document improves the adhesion strength of the liquid crystal polymer molded body to an epoxy resin.

CONVENTIONAL ART DOCUMENT

Patent Document

[Patent Document 1] JP Laid-open Patent Publication No. H1-216824
[Patent Document 2] JP Laid-open Patent Publication No. H1-236246
[Patent Document 3] JP Patent No. 4892274

SUMMARY OF THE INVENTION

However, Patent Documents 1 and 2 only evaluate acrylic resin paint films applied to molded bodies.

Patent Document 3 also describes that where the surface part has a ratio (%) of the sum of peak areas of the [—C—O— bond] and the [—COO— bond] based on a total C(1s) peak area of 21% or higher, bonding breakage of liquid crystal polymer molecules are moderately proceeded in the surface part of the adherend portion of the liquid crystal polymer molded body so that the surface part has increased reactivity, resulting in mainly improved initial adhesion. The document also describes that where the ratio of the peak areas [—C—O— bond]/[—COO— bond] is 1.5 or lower, adhesion can be maintained for a long period of time so as to improve long-term reliability of the product.

However, Patent Document 3 merely evaluates adhesion to conventional epoxy adhesives. Since epoxy adhesives and acrylic adhesives that have been conventionally used for electronic circuit boards have higher dielectric constant and dielectric dissipation factor than those of TLCP films, these adhesives, if used, spoil the excellent dielectric characteristics of the TLCP films.

On the other hand, even where an adherend has good adhesion to epoxy adhesives or acrylic adhesives, that does not necessarily mean that the adherend also has good adhesion to other adhesives because adhesion strength between an adhesive and an adherend generally depends on compatibility between them. Hence, there is a room for further improvement in adhesion of the TLCP molded body to adhesives other than epoxy adhesives or acrylic adhesives.

Accordingly, an object of the present invention is to provide a TLCP molded body having an improved adhesion property to various adhesion targets.

Another object of the present invention is to provide a method for manufacturing a TLCP molded body capable of being modified such that a surface of an adherend portion of the TLCP molded body has a good adhesive property.

Based on the result of intensive studies to achieve the above objects, the inventors of the present invention have found that where at least a part of a surface of a TLCP molded body is subjected to plasma treatment at an unexpectedly high output per unit area for an extremely short processing time as compared with conventional ones, the TLCP molded body can have an improved adhesion property to a wide range of adhesion targets presumably because the surface of the adherend portion of the TLCP molded body can be modified such that the surface has the ratios <C—O>/<COO> and <C=O>/<COO> of the proportions of the peak areas based on the C(1s) peak area in specific relations. The inventors thus achieved the present invention.

That is, the present invention may include the following aspects.

Aspect 1

A thermoplastic liquid crystal polymer molded body comprising a thermoplastic polymer capable of forming an optically anisotropic melt phase (hereafter referred to as a thermoplastic liquid crystal polymer or TLCP), wherein the TLCP molded body includes an adherend portion in at least a part of the TLCP molded body, and the adherend portion has a surface satisfying:

a ratio of <C—O> relative to <COO>, i.e., <C—O>/<COO> of 1.5 or greater (preferably 1.6 or greater, and more preferably 1.7 or greater) in which the <C—O> represents a proportion of a peak area of [C—O bond] based on a C(1s) peak area, and the <COO> represents a proportion of a peak area of [COO bond] based on the C(1s) peak area; and a ratio of <C=O> relative to <COO>, i.e., <C=O>/<COO> of 0.10 or higher (preferably 0.12 or higher, more preferably 0.25 or higher, and further preferably 0.40 or higher) in which the <C=O> represents a proportion of a peak area of [C=O bond] based on the C(1s) peak area, and the <COO> represents the proportion of the peak area of the [COO bond] based on the C(1s) peak area in a result of X-ray photoelectron spectroscopy analysis of the surface of the adherend portion.

Aspect 2

The TLCP molded body according to aspect 1, wherein the TLCP molded body is shaped in a film form.

Aspect 3

The TLCP molded body according to the aspect 1 or 2, further comprising an adhesion target, wherein the adhesion target is adhered to the adherend portion.

Aspect 4

The TLCP molded body according to the aspect 3, wherein the adhesion target is an adhesive.

Aspect 5

The TLCP molded body according to the aspect 4, wherein the adhesive has a relative dielectric constant (ε) of 3.3 or lower and a dielectric dissipation factor (tan δ) of 0.04 or lower at a frequency of 10 GHz.

Aspect 6

The TLCP molded body according to the aspect 3, wherein the adhesion target is a TLCP adherend body (preferably a TLCP film).

Aspect 7

The TLCP molded body according to any one of the aspects 3 to 6, wherein adhesion strength between the TLCP molded body and the adhesion target is 7.0 N/cm or higher (preferably 7.5 N/cm or higher, and more preferably 8.0 N/cm or higher).

Aspect 8

The TLCP molded body according to any one of the aspects 1 to 7, comprising a metal part (for example, a metal foil).

Aspect 9

The TLCP molded body according to any one of the aspects 1 to 8, comprising a circuit.

Aspect 10

A method of manufacturing a TLCP molded body, the method comprising a surface treatment step of performing plasma treatment to at least a part of a surface of the TLCP molded body, wherein the plasma treatment is performed in a direct system at an output of 2.5 W/cm$^2$ or higher (preferably 2.8 W/cm$^2$ or higher, more preferably 3.0 W/cm$^2$ or higher, and further preferably 3.2 W/cm$^2$ or higher) for a processing time shorter than 5 seconds (preferably shorter than 4 seconds, and more preferably shorter than 3 seconds) to give a plasma-treated portion.

Aspect 11

The method according to the aspect 10, wherein a gas species in the plasma treatment at least includes a nitrogen-containing gas and/or an oxygen-containing gas (preferably includes $N_2$ as the nitrogen-containing gas and optionally at least one selected from $O_2$ and $H_2O$ as the oxygen-containing gas).

Aspect 12

The method according to the aspect 10 or 11, wherein the surface treatment step is carried out by roll-to-roll processing.

Aspect 13

The method according to any one of the aspects 10 to 12, further comprising at least an adhesion step of adhering an adhesion target to an adherend portion including at least a part of the plasma-treated portion.

In the context of this specification, a "TLCP molded body" refers to a molded body at least containing a thermoplastic liquid crystal polymer. Examples of the TLCP molded body may include a plasma-untreated molded body which is not subjected to a plasma treatment, a molded body to be adhered to an adhesion target (a non-bonded body or a first TLCP molded body), and a molded body adhered to an adhesion target (a bonded body or a second TLCP molded body).

It should be noted that a "proportion of a peak area" is calculated as a proportion of a peak area of each of the [C—O bond], [C=O bond], and [COO bond] based on a total of peak areas of respective peaks of C(1s) observed for the respective bonding states. In the present specification, hereinafter, a proportion of the peak area of the [C—O bond] based the total peak area of the respective peaks of the C(1s) is denoted as <C—O>; a proportion of the peak area of the [C=O bond] to the total peak area of the respective peaks of the C(1s) is denoted as <C=O>; and a proportion of the peak area of the [COO bond] to the total peak area of the respective peaks of the C(1s) is denoted as <COO>.

The present invention encompasses any combination of at least two features disclosed in the claims and/or the specification. In particular, any combination of two or more of the appended claims should be equally construed as included within the scope of the present invention.

EFFECTS OF THE INVENTION

According to the TLCP molded body of the present invention, since the TLCP molded body has a surface in an adherend portion in a specific chemical bonding state, the TLCP molded body has a high initial adhesion property regarding adhesion to an adhesion target (in particular, adhesion to various types of adhesives). Furthermore, according to the preferable TLCP molded body, the molded body is also excellent in maintaining adhesion strength for a long period of time after adhesion to an adhesion target and thus provides high long-term reliability. Therefore, the TLCP molded body of the present invention is extremely useful as, for example, an insulator material for electronic circuit boards having excellent durability when the TLCP molded body is formed as electronic circuit boards with a metal layer and/or a circuit.

Moreover, the manufacturing method of the present invention is extremely industrially useful in that it can produce a TLCP molded body in which a surface of an adherend portion of the TLCP molded body is modified to have a good adhesion property.

DESCRIPTION OF THE EMBODIMENTS

Thermoplastic Liquid Crystal Polymer

The TLCP molded body of the present invention comprises a thermoplastic liquid crystal polymer. The thermoplastic liquid crystal polymer is formed from a melt-processable liquid crystalline polymer (or a polymer capable of forming an optically anisotropic melt phase). Chemical formulation of the thermoplastic liquid crystal polymer is not particularly limited to a specific one as long as it is a melt-processable liquid crystalline polymer, and examples thereof may include a thermoplastic liquid crystal polyester, or a thermoplastic liquid crystal polyester amide having an amide bond introduced thereto.

The thermoplastic liquid crystal polymer may also be a polymer obtained by further introducing, to an aromatic polyester or an aromatic polyester amide, an imide bond, a carbonate bond, a carbodiimide bond, or an isocyanate-derived bond such as an isocyanurate bond.

Specific examples of the thermoplastic liquid crystal polymer used in the present invention may include known thermoplastic liquid crystal polyesters and thermoplastic liquid crystal polyester amides obtained from compounds classified as (1) to (4) as exemplified in the following, and derivatives thereof. However, it is needless to say that, in order to form a polymer capable of forming an optically anisotropic melt phase, there is a suitable range regarding the combination of various raw-material compounds.

(1) Aromatic or Aliphatic Diols (See Table 1 for Representative Examples)

TABLE 1

Chemical structural formulae of representative examples of aromatic or aliphatic dihydroxyl compounds

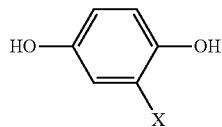

X represents a hydrogen atom
or
a halogen atom, or a group such
as a lower alkyl (e.g., $C_{1-3}$
alkyl)
or a phenyl

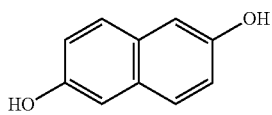

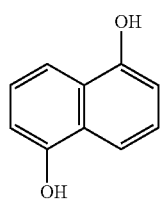 [SMILES: Oc1cccc2c(O)cccc12]

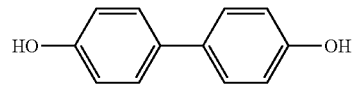

TABLE 1-continued

Chemical structural formulae of representative examples of aromatic or aliphatic dihydroxyl compounds

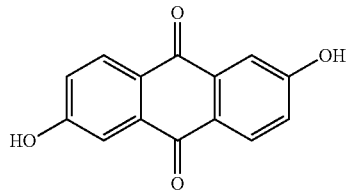 [SMILES: O=C1c2ccc(O)cc2C(=O)c2ccc(O)cc21]

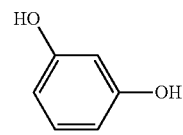

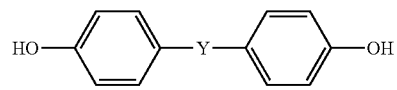

Y represents a group such
as —O—, —$CH_2$—,
—S—, —CO—,
—$C(CH_3)_2$—, or —$SO_2$—

$HO(CH_2)_nOH$ n is an integer of 2 to 12

(2) Aromatic or Aliphatic Dicarboxylic Acids (See Table 2 for Representative Examples)

TABLE 2

Chemical structural formulae of representative examples of aromatic or aliphatic dicarboxylic acids

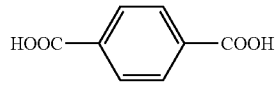 [SMILES: O=C(O)c1ccc(C(=O)O)cc1]

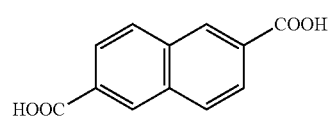 [SMILES: O=C(O)c1ccc2cc(C(=O)O)ccc2c1]

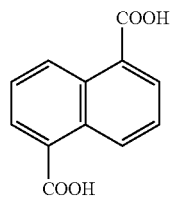 [SMILES: O=C(O)c1cccc2c(C(=O)O)cccc12]

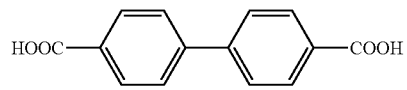

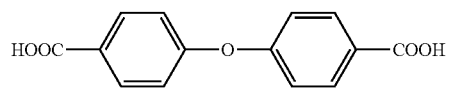 [SMILES: O=C(O)c1ccc(Oc2ccc(C(=O)O)cc2)cc1]

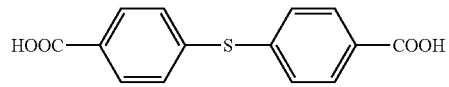

TABLE 2-continued

Chemical structural formulae of representative examples of aromatic or aliphatic dicarboxylic acids

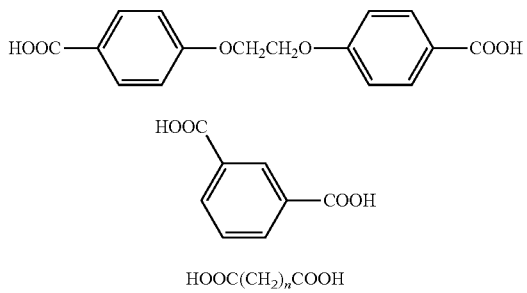

HOOC(CH$_2$)$_n$COOH n is an integer of 2 to 12

(3) Aromatic Hydroxycarboxylic Acids (See Table 3 for Representative Examples)

TABLE 3

Chemical structural formulae of representative examples of aromatic hydroxycarboxylic acids

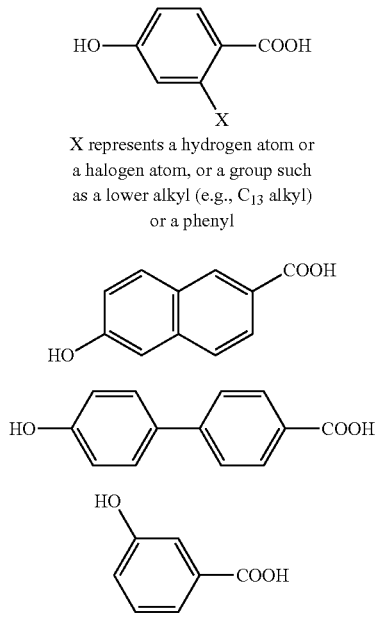

X represents a hydrogen atom or a halogen atom, or a group such as a lower alkyl (e.g., C$_{13}$ alkyl) or a phenyl

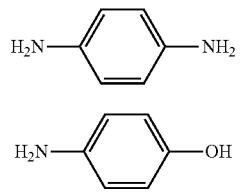

(4) Aromatic Diamines, Aromatic Hydroxy Amines, and Aromatic Aminocarboxylic Acids (See Table 4 for Representative Examples)

TABLE 4

Chemical structural formulae of representative examples of aromatic diamines, aromatic hydroxy amines, or aromatic aminocarboxylic acids

H$_2$N—⬡—NH$_2$

H$_2$N—⬡—OH

TABLE 4-continued

Chemical structural formulae of representative examples of aromatic diamines, aromatic hydroxy amines, or aromatic aminocarboxylic acids

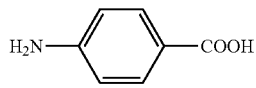

Representative examples of liquid crystal polymers obtained from these raw-material compounds may include copolymers having structural units shown in Tables 5 and 6.

TABLE 5

Representative examples (1) of thermoplastic liquid crystal polymer (A) 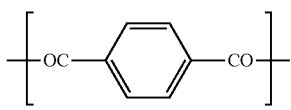

—[OCH$_2$CH$_2$O]—

(B) 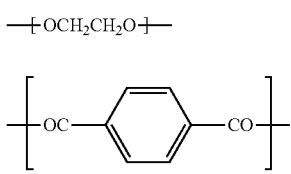

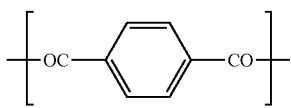

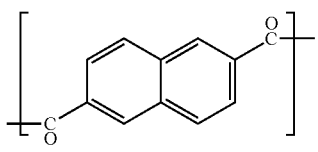

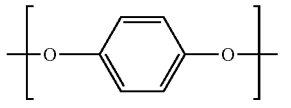

(C) 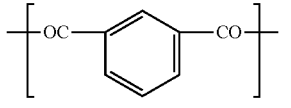

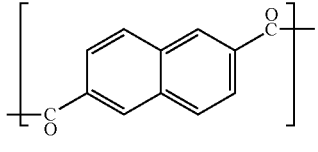

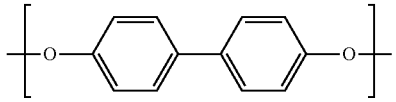

(D) 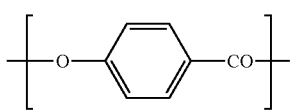

TABLE 5-continued
Representative examples (1) of thermoplastic liquid crystal polymer
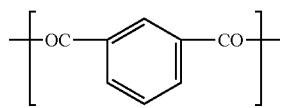
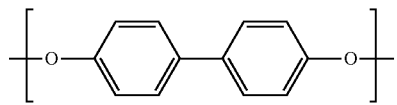
(E)
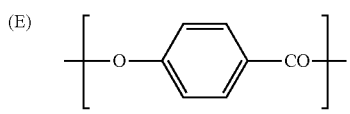
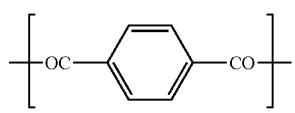
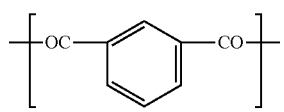
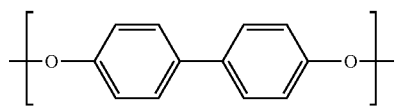
(F)
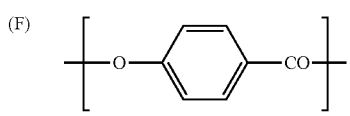
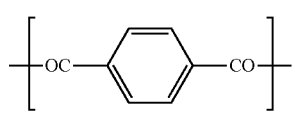
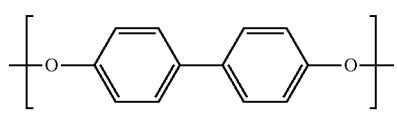
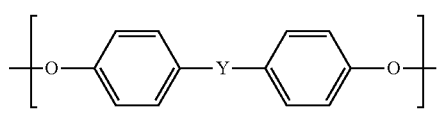
Y is a group such as
—O—,
—S—, or
—CH$_2$,—
(G)
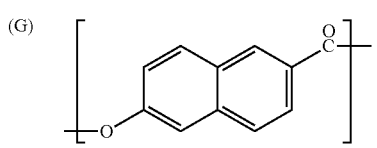
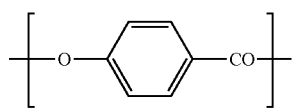
TABLE 5-continued
Representative examples (1) of thermoplastic liquid crystal polymer
(H)
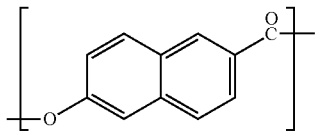
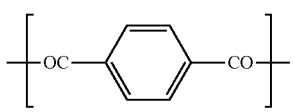
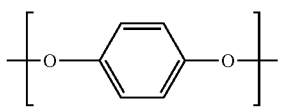
(I)
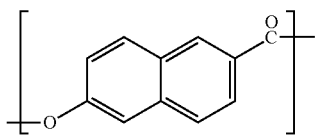
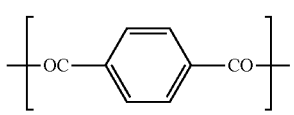
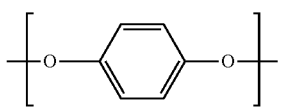
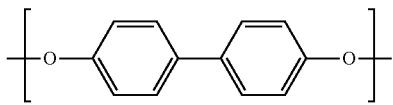
(J)
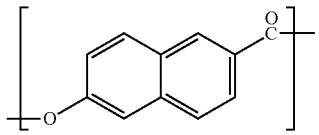
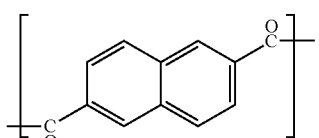
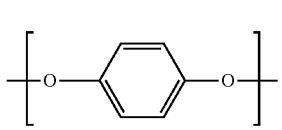
TABLE 6
Representative examples (2) of thermoplastic liquid crystal polymer
(K)
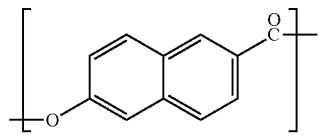

TABLE 6-continued
Representative examples (2) of thermoplastic liquid crystal polymer
(L) 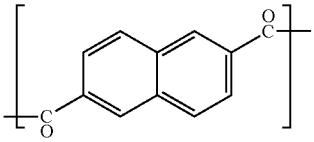
(M) 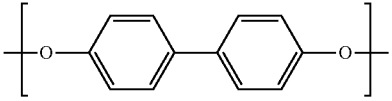
(N) 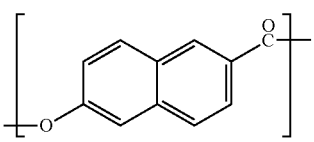
(O) 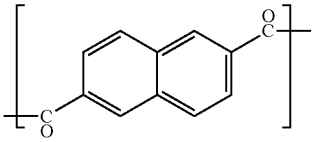
(P) 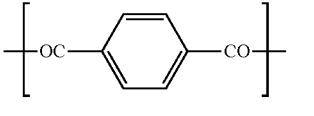

TABLE 6-continued

Representative examples (2) of thermoplastic liquid crystal polymer

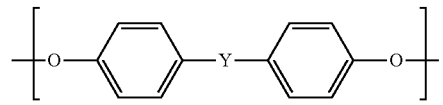

Y is a group such as
—O—,
—S—, or
—CH$_2$—

(Q) 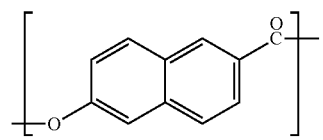

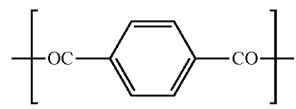

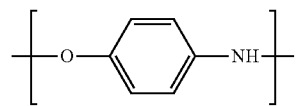

Of these copolymers, preferable polymers include at least p-hydroxybenzoic acid and/or 6-hydroxy-2-naphthoic acid as repeating units, and particularly preferred polymers include:
- a polymer (i) having repeating units of p-hydroxybenzoic acid and 6-hydroxy-2-naphthoic acid; and
- a copolymer (ii) having repeating units of
  - at least one aromatic hydroxycarboxylic acid selected from a group consisting of p-hydroxybenzoic acid and 6-hydroxy-2-naphthoic acid,
  - at least one aromatic diol, and
  - at least one aromatic dicarboxylic acid.

For example, in the case where the polymer (i) comprises a thermoplastic liquid crystal polymer having repeating units of: at least p-hydroxybenzoic acid (A) and 6-hydroxy-2-naphthoic acid (B), the thermoplastic liquid crystal polymer may have a mole ratio (A)/(B) of preferably about (A)/(B)= 10/90 to 90/10, more preferably about (A)/(B)=15/85 to 85/15, and further preferably about (A)/(B)=20/80 to 80/20.

Furthermore, in the case where the polymer (ii) comprises a thermoplastic liquid crystal polymer having repeating units of: at least one aromatic hydroxycarboxylic acid (C) selected from a group consisting of p-hydroxybenzoic acid and 6-hydroxy-2-naphthoic acid; at least one aromatic diol (D) selected from a group consisting of 4,4'-dihydroxybiphenyl, hydroquinone, and 4,4'-dihydroxydiphenyl ether; and at least one aromatic dicarboxylic acid (E) selected from a group consisting of terephthalic acid, isophthalic acid, and 2,6-naphthalene dicarboxylic acid, the thermoplastic liquid crystal polymer may have a mole ratio of about aromatic hydroxycarboxylic acid (C):aromatic diol (D):aromatic dicarboxylic acid (E)=30 to 80:35 to 10:35 to 10, more preferably about (C):(D):(E)=35 to 75:32.5 to 12.5:32.5 to 12.5, and further preferably about (C):(D):(E)=40 to 70:30 to 15:30 to 15.

Furthermore, the liquid crystal polymer may have a mole ratio of a repeating structural unit derived from 6-hydroxy-2-naphthoic acid to the aromatic hydroxycarboxylic acids (C), for example, of 85 mol % or higher, preferably 90 mol % or higher, and more preferably 95 mol % or higher. The liquid crystal polymer may have a mole ratio of a repeating structural unit derived from 2,6-naphthalene dicarboxylic acid to the aromatic dicarboxylic acids (E), for example, of 85 mol % or higher, preferably 90 mol % or higher, and more preferably 95 mol % or higher.

The aromatic diol (D) may include repeating structural units (D1) and (D2) derived from two different aromatic diols each selected from a group consisting of hydroquinone, 4,4'-dihydroxybiphenyl, phenylhydroquinone, and 4,4'-dihydroxydiphenyl ether. In such a case, the two aromatic diols may have a mole ratio (D1)/(D2)=23/77 to 77/23, more preferably 25/75 to 75/25, and further preferably 30/70 to 70/30.

Furthermore, the liquid crystal polymer may have a mole ratio of a repeating structural unit derived from an aromatic diol to a repeating structural unit derived from an aromatic dicarboxylic acid of preferably (D)/(E)=95/100 to 100/95. Deviation from this range may tend to result in a low degree of polymerization and deterioration in mechanical strength.

It should be noted that, in the present invention, optical anisotropy in a molten state can be determined by, for example, placing a sample on a hot stage, heating the sample at an elevating temperature under nitrogen atmosphere, and observing light transmitted through the sample.

A preferred thermoplastic liquid crystal polymer has a melting point (hereinafter, referred to as $Tm_0$) in a range, for example, from 200° C. to 360° C., preferably from 240° C. to 350° C., and more preferably from 260° C. to 330° C. The melting point may be determined by observing thermal behavior of a thermoplastic liquid crystal polymer sample using a differential scanning calorimeter. That is, a melting point of a thermoplastic liquid crystal polymer sample may be determined by subjecting the sample to temperature increase at a rate of 10° C./min to completely melt the sample, then to rapid cooling at a rate of 10° C./min to 50° C., and again to temperature increase at a rate of 10° C./min to determine the position of an endothermic peak that occurs during the second temperature increase as the melting point of the polymer sample.

In terms of melt moldability, the thermoplastic liquid crystal polymer may have a melt viscosity, for example, from 30 to 120 Pa·s (preferably from 50 to 100 Pa·s) at a temperature of $(Tm_0+20)$° C. at a shear rate of 1000/s.

As long as the advantageous effect of the present invention is not deteriorated, to the thermoplastic liquid crystal polymer, may be added any thermoplastic polymer such as a polyethylene terephthalate, a modified polyethylene terephthalate, a polyolefin, a polycarbonate, a polyarylate, a polyamide, a polyphenylene sulfide, a polyether ether ketone, and a fluorine-containing resin; and/or various additives. If necessary, a filler may be added to the thermoplastic liquid crystal polymer.

Method of Manufacturing TLCP Molded Body (First Manufacturing Step)

A method of manufacturing a first TLCP molded body of the present invention comprises a surface treatment step of performing plasma treatment to at least a part of a surface of the TLCP molded body, wherein the plasma treatment is performed in a direct system at an output of 2.5 W/cm$^2$ or higher for a processing time of shorter than 5 seconds.

In general, plasma treatment may be carried out in a direct system in which a substrate (workpiece) to be processed is directly placed in a plasma-creating chamber to carry out a plasma treatment, or in a remote system in which a substrate (workpiece) to be processed is placed in a chamber outside a plasma-creating chamber, and active species generated in the plasma-creating chamber is blown (introduced) onto the substrate to carry out a plasma treatment. The present invention employs a direct system because this is an advantageous process to perform the plasma treatment to the TLCP molded body at a high output.

In the direct process, plasma treatment is carried out by supplying electric power between a pair of electrodes used as discharging plates in parallel under a vacuum or atmospheric environment where gas species are introduced to generate plasma discharge and irradiating the generated plasma to at least a part of a surface of a TLCP molded body.

In the TLCP molded body to be plasma-treated according to the present invention, the surface of the TLCP molded body refers to a portion near the outermost surface of the TLCP molded body (in a range from approximately 10 to 100 nm from the outermost surface in a depth direction).

In the present invention, since the plasma treatment is carried out at a high output of 2.5 W/cm$^2$ or higher for a processing time of shorter than 5 seconds, the surface of the TLCP molded body can be modified so as to have a specific chemical bonding state, and the plasma-treated surface can thus have improved reactivity, i.e., an improved adhesion property.

Specifically, it is considered that a surface of an adherend portion of a TLCP molded body before subjecting to plasma treatment mainly has [C—O bond] and [COO bond] derived from ester bonds (—C(=O)O—C—) as main chemical bonds, other than [CH bond] derived from benzene rings or the like. The plasma-untreated surface has substantially or completely no [C=O bond] derived from carbonyl groups (which hereinafter refers to carbonyl groups of ketones and aldehydes which are not derived from ester bonds and amide bonds). According to the present invention, the plasma treatment to such an untreated TLCP molded body makes it possible to increase, on the surface of the adherend portion, the ratio <C—O>/<COO> as well as the ratio <C=O>/<COO> in which the <C—O> represents a proportion of the peak area of the [C—O bond] based on the total peak area of each of the peaks of the C(1s); the <COO> represents a proportion of the peak area of the [COO bond] based on the total peak area of the respective peaks of the C(1s); and the <C=O> represents a proportion of the peak area of the [C=O bond] based on the total peak area of each of the peaks of the C(1s).

The plasma treatment may be carried out at an output of 2.5 W/cm$^2$ or higher, preferably 2.8 W/cm$^2$ or higher, more preferably 3.0 W/cm$^2$ or higher, and further preferably 3.2 W/cm$^2$ or higher. The upper limit of the output in the plasma treatment is not particularly limited and may be, for example, 8.0 W/cm$^2$ or lower, preferably 7.5 W/cm$^2$ or lower, and more preferably 7.0 W/cm$^2$ or lower in order to suppress excess damage to the surface of the TLCP molded body.

Increased output in the plasma treatment makes it possible to shorten the time needed for the plasma treatment of the TLCP molded body. Specifically, the plasma treatment may be carried out for a time shorter than 5 seconds, preferably 4 seconds or shorter, and more preferably 3 seconds or shorter. The lower limit of the time of the plasma treatment is not particularly limited and may be, for example, 0.1 second or longer, preferably 0.3 second or longer, and more preferably 0.5 second or longer in order to sufficiently modify the surface of the TLCP molded body. Note that the time of the plasma treatment means a period of time for which plasma is irradiated to a same portion of the TLCP molded body.

In the present invention, it is only necessary to perform the plasma treatment to at least a part of the TLCP molded body. As the plasma treatment in the present invention provides a highly lasting effect, the plasma treatment may be carried out to an area that may potentially be an adherend portion. For example, areas that may potentially be an adherend portion may include: a portion where a cover film, a glass/epoxy material or the like is overlaid; a portion where a metal layer is overlaid; and a portion where a circuit is formed.

In the present invention, a cumulative processing power obtained by multiplying an output of the plasma treatment by a processing time (a value obtained by multiplying an output per unit area by a processing time) may be 1.2 W·s/cm$^2$ or higher, preferably 2.0 W·s/cm$^2$ or higher, and more preferably 2.5 W·s/cm$^2$ or higher. The upper limit of the output for the plasma treatment is not particularly limited and may be, for example, 30 W·s/cm$^2$ or lower, preferably 25 W·s/cm$^2$ or lower, and more preferably 20 W·s/cm$^2$ or lower in order to suppress excess damage to the surface of the TLCP molded body.

In the present invention, the frequency of discharge between the discharging electrodes in the plasma treatment is not particularly limited and may be, for example, in a range from 1 kHz to 2.45 GHz, preferably from 10 kHz to 100 MHz, and more preferably from 30 kHz to 13.56 MHz.

The plasma treatment may be carried out in either processing mode of direct plasma mode (DP) or reactive ion etching (RIE). In the DP, a substrate is placed on an electrode that is grounded between the pair of electrodes, providing the advantage that radicals can uniformly act on the whole substrate. On the other hand, in the RIE, a substrate is placed on an electrode connected to an RF power source between the pair of electrodes, and ions collide with the substrate while being accelerated. In the present invention, it is preferable to employ the DP as the processing mode in order to uniformly supply radicals to the substrate so as to uniformly modify the substrate surface.

The plasma treatment may be carried out in a continuous discharge mode which applies a voltage having a continuous waveform (alternating current waveform) or in a pulse discharge mode which applies a voltage having a pulse-like waveform. In order to stabilize the discharge, it is preferable to employ the pulse discharge mode which applies a voltage having a pulse-like waveform. In this case, it is possible to obtain the effect of uniform surface modification even with the treatment for a short period of time as described above.

The plasma treatment may be carried out through vacuum plasma treatment or atmospheric plasma treatment. In order to increase all of the <C—O>, <C=O>, and <COO> on the surface of the adherend portion, the vacuum plasma treatment is preferred. Where the vacuum plasma treatment is employed, the pressure in a chamber for carrying out the plasma treatment may be from 0.1 to 20 Pa, preferably from 0.3 to 15 Pa, and more preferably from 0.5 to 13 Pa in order to generate electrons and ions at densities within sufficient ranges to modify the surface of the TLCP molded body.

Gas species used in the plasma treatment of the present invention are not particularly limited as long as they can impart a good adhesion property to the adherend portion of the TLCP molded body. Examples of such gas species may include a nitrogen-containing gas, an oxygen-containing gas, a rare gas such as Ar, $H_2$, and $CF_4$. These gas species may be used singly or in a combination of two or more.

Where the gas species are used in combination, for example, a plurality of nitrogen-containing gas species may be used in combination; a plurality of oxygen-containing gas species may be used in combination; one or more of nitrogen-containing gas species and one or more of oxygen-containing gas species may be used in combination; or an oxygen-containing gas species (for example, $O_2$) and $CF_4$ may be combined.

Preferably, in the plasma treatment of the present invention, the gas species may include at least a nitrogen-containing gas species and/or an oxygen-containing gas species. In particular, the gas species may include at least a nitrogen-containing gas species. A nitrogen-containing gas species may include, for example, $N_2$, $NH_3$, and $NO_2$. Of these, $N_2$ is preferably used. They may be used singly or in a combination of two or more.

The plasma treatment in which the gas species include a nitrogen-containing gas and/or an oxygen-containing gas can enhance a long-term adhesion property. The reason is not certain but presumably because the plasma treatment modifies the outermost surface part (in a range from 5 to 10 nm from the outermost surface in the depth direction) such that functional groups contributing to the adhesion property are hardly turned over into inward and that the surface is less susceptible to influence of desorption of carbon dioxide as time passes after plasma treatment. Although the mechanism is not revealed, when considered at the atomic level, the plasma treatment of the present invention is carried out at an increased output for shorter processing time as compared to those of conventional plasma treatment, so that the effect of the plasma treatment may be exhibited in a near outermost surface portion (10 to 100 nm) rather than the outermost surface portion (5 to 10 nm). Accordingly, movement of the functional groups was suppressed so that the functional groups contributing the adhesion property exist on the outermost surface portion, resulting in suppression of deterioration in the adhesion property.

The surface of the adherend portion of the plasma-treated TLCP molded body can maintain the specific relation of <C—O>, <C=O>, and <COO> without substantial change, even where the TLCP molded body is stored for a long period of time (for example, 2 months) at room temperature without being adhered after the treatment. Probably because of this, even where the plasma-treated TLCP molded body is adhered to an adhesion target after prolonged storage, the surface of the adherend portion can maintain the high initial adhesion property after adhesion and can also maintain adhesion strength for a long term after adhesion to the adhesion target.

In order to sufficiently modify the surface of the TLCP molded body, the gas species preferably include $N_2$ as a nitrogen-containing gas and, optionally, an oxygen-containing gas as other gas species.

Examples of the oxygen-containing gas may include $O_2$, CO, $CO_2$, $H_2O$ or the like. They may be used singly or in a combination of two or more. Of these, $O_2$ and/or $H_2O$ are/is preferably used. Particularly preferably, both of $O_2$ and $H_2O$ are used. Where a gas species (such as $NO_2$) contains both of nitrogen and oxygen atoms, it is regarded as a nitrogen-containing gas as long as it contains a nitrogen atom.

For example, a volumetric ratio of the nitrogen-containing gas and oxygen-containing gas (nitrogen-containing gas/oxygen-containing gas) may be from 30/70 to 100/0, preferably from 40/60 to 95/5, and more preferably from 50/50 to 90/10.

Other conditions of the plasma treatment may be suitably adjusted. For example, the distance between an irradiation head of a plasma treatment device and the surface of the TLCP molded body (e.g., the distance between the head and the film) may be from 3 to 10 mm, preferably from 4 to 9 mm, and more preferably from 5 to 8 mm.

In the present invention, the surface treatment step may be carried out continuously or in a batch system. In the present invention, the plasma treatment is preferably carried out continuously in terms of productivity because of the short processing time of the plasma treatment.

In particular, where the TLCP molded body is shaped in a film form, the plasma treatment may be carried out continuously by roll-to-roll processing, using either a continuous plasma processor internally equipped with a film unwinder and a film winder or a continuous plasma processor externally equipped with a film unwinder and a film winder.

Where the plasma treatment is carried out to a thermoplastic liquid crystal polymer having a film form (hereinafter, referred to as TLCP film) by roll-to-roll processing, the film may be wound at a rate about from 1 to 10 m/min, preferably about from 2 to 8 m/min, and more preferably about from 3 to 5 m/min in terms of productivity and processing time.

In the present invention, the TLCP molded body comprises at least a thermoplastic liquid crystal polymer. The TLCP molded body may consist of a thermoplastic liquid crystal polymer or may comprise a thermoplastic liquid crystal polymer and other substances. The TLCP molded body of the present invention is not particularly limited in terms of the shape and may have, for example, a molded shape capable of being produced by cast-molding of the thermoplastic liquid crystal polymer or by injection-molding or extrusion-molding. Preferably, the TLCP molded body may be shaped in the form of a film, a sheet, fibers, or a fabric. More preferably, the TLCP molded body has a film form.

The TLCP film may be an extrusion-molded film of a thermoplastic liquid crystal polymer. In this regard, although any extrusion molding process may be used, industrially advantageous processes may include well-known T-die extrusion process, laminate-drawing process, inflation process or the like. For example, the TLCP film may have a thickness from 10 to 500 μm, preferably from 20 to 200 μm, and more preferably from 25 to 125 μm. In particular, where the TLCP film is used as a circuit board material, the thickness may preferably be from 20 to 150 μm, and more preferably from 20 to 50 μm.

First TLCP Molded Body

A first TLCP molded body of the present invention includes an adherend portion in at least a part of the molded body, and the adherend portion has a surface satisfying: a ratio of <C—O> relative to <COO>, i.e., <C—O>/<COO> of 1.5 or higher in which the <C—O> represents a proportion of a peak area of [C—O bond] based on a C(1s) peak area; and the <COO> represents a proportion of a peak area of [COO bond] based on the C(1s) peak area; and a ratio of <C=O> relative to <COO>, i.e., <C=O>/<COO> of 0.10 or higher in which the <C=O> represents a proportion of a peak area of [C=O bond] based on the C(1s) peak area; and the <COO> represents the proportion of the peak area of the [COO bond] based on the C(1s) peak area in a result of X-ray photoelectron spectroscopy analysis of the surface of the adherend portion.

The X-ray photoelectron spectroscopy analysis is a process of irradiating X-rays from a target metal onto a sample surface to excite inner shell electrons of atoms and detecting kinetic energy of photoelectrons emitted thereby to identify elements or analyze chemical bonding state on the sample surface. The C(1s) in the X-ray photoelectron spectroscopy analysis is a peak generated by photoelectrons from carbon atoms present on the sample surface. This peak further includes various peaks which depend on bonding states of the carbon atoms, and the respective peaks are observed at different positions in accordance with the bonding states in a spectrum.

For example, the peaks of the respective bonding states appear at the following positions: [CH bond]: 285 eV, [C—N bond]: 285.7 eV, [C—O bond]: 286.6 eV, [C=O bond]: 287.7 eV, [COO bond]: 289.4 eV, [OCOO bond]: 290 eV, and [π-π*satellite peak]: 291.9 eV. They can be separated into individual peaks using a waveform separation mechanism implemented in the device. It should be noted that the peak of the [C—O bond] includes both peaks of ether bonds and hydroxy groups, and the peak of the [COO bond] includes both peaks of ester bonds and carboxy groups.

As for the peak separation process, it is preferable to employ a Gaussian-Lorentzian mixed function as a distribution function for determining the peak shape and to make half-widths of the respective peaks as constant as possible.

It has been found that thanks to the above-described plasma treatment, the TLCP molded body of the present invention can have the proportions <C—O>, <C=O>, and <COO> of the peak areas of the respective bonds that give the ratios of the proportions <C—O>/<COO> and <C=O>/<COO> in specific relations in a result of X-ray photoelectron spectroscopy analysis of the surface of the adherend portion, and that such a TLCP molded body can have an improved adhesion property to various adhesion targets.

Specifically, it has been found that the above-described plasma treatment can increase both the proportion of the peak area of the [C—O bond] derived from ether bonds or hydroxy groups and the proportion of the peak area of the [C=O bond] derived from carbonyl groups relative to the peak area of the [COO bond] derived from ester bonds or carboxy groups. Thanks to the increased existence ratios of the [C=O bond] (carbonyl groups) and the [C—O bond] (hydroxy groups) that is not derived from ester bonds, various types of polar functional groups can be introduced into the surface of the adherend portion in specific proportions. Probably because of this, the adhesion property of the TLCP molded body is enhanced not only to conventional epoxy adhesives and acrylic adhesives, but also to various adhesives such as low dielectric adhesives having nonpolar backbones.

(1) <C—O>/<COO>

In order to improve the adhesion property, the adherend portion of the TLCP molded body of the present invention may have a surface satisfying a ratio <C—O>/<COO> (a ratio of <C—O> relative to <COO>) of 1.5 or higher, preferably 1.6 or higher, and more preferably 1.7 or higher. The upper limit of the ratio <C—O>/<COO> of the proportions of the peak areas is not particularly limited and may be, for example, 3.0 or lower.

(2) <C=O>/<COO>

In addition, the adherend portion may have a surface satisfying a ratio <C=O>/<COO> (a ratio of <C=O> relative to <COO>) of 0.10 or higher, preferably 0.12 or higher, more preferably 0.25 or higher, and further preferably 0.40 or higher. The upper limit of the ratio <C=O>/<COO> of the proportions of the peak areas is not particularly limited and may be, for example, lower than 1.0, preferably 0.95 or lower, more preferably 0.70 or lower, further preferably 0.65 or lower in order to prevent excess increase in the [C=O bond] derived from carbonyl groups which are produced by the plasma treatment and to suppress excess damage to the surface of the TLCP molded body.

As long as the ratios <C—O>/<COO> and <C=O>/<COO> above-described in (1) and (2) fall within predetermined ranges, the proportions <C—O>, <C=O>, and <COO> are not specifically limited.

For example, the proportion <C—O> may be from 12.0 to 30.0%, preferably from 16.0 to 28.0%, further preferably from 18.0 to 26.0%, and still more preferably from 19.0 to 25.0%.

For example, the proportion <C=O> may be from 1.0 to 10.0% (for example, from 1.5 to 10.0%), preferably from 3.5 to 9.0%, further preferably from 4.0 to 8.0%, and still more preferably from 4.5 to 6.5%.

For example, the proportion <COO> may be from 8.0 to 15.0%, preferably from 8.3 to 14.0%, further preferably from 8.5 to 13.0%, and still more preferably from 9.0 to 12.0%.

(3) <C—O>+<C=O>+<COO>

If needed, in order to improve the adhesion property, the adherend portion of the TLCP molded body of the present invention may have a surface satisfying a sum of the proportions <C—O>, <C=O>, and <COO> of 25% or higher, preferably 28% or higher, and more preferably 30% or higher. The upper limit of the sum of the proportions <C—O>, <C=O>, and <COO> of the peak areas is not particularly limited and may be, for example, 50% or lower.

In the TLCP molded body of the present invention, it is only necessary that the plasma-treated portion satisfies the specific relations concerning the X-ray photoelectron spectroscopy analysis.

Since the TLCP molded body of the present invention has an improved adhesion property on the surface of the adherend portion, the TLCP molded body can be improved not only in terms of adhesion involving various adhesives, but also in terms of adhesion without adhesives, such as thermocompression bonding.

Method of Manufacturing TLCP Molded Body (Second Manufacturing Step)

A method of manufacturing a second TLCP molded body of the present invention may comprise at least a surface treatment step (first process) of performing plasma treatment to at least a part of a surface of the TLCP molded body and an adhesion step (second process) of adhering an adhesion target to an adherend portion including at least a part of the plasma-treated portion.

As for the adhesion step, any adhesion process suitable for the adhesion target may be selected. In the adhesion process, the adhesion target can be adhered to the TLCP molded body by thermal bonding etc.

In the process of thermal bonding, an adhesion target is brought into contact with the adherend portion including at least a part of the plasma-treated portion, and the adhesion target and the adherend portion are heated so as to be bonded. As long as the process can reach to a suitable temperature for the thermal bonding, a heating means may be either of a combustion type which burns a heat source or an electric type which electrically performs heating.

As long as the adhesion target can be directly adhered to the adherend portion of the TLCP molded body, the adhesion target used in thermal bonding is not particularly limited and may be suitably selected according to the purpose. Examples of the adhesion target may include an adhesive (preferably, adhesive sheet) and a TLCP adherend body (preferably, TLCP film). The above-described plasma treatment may be performed to the adhesion target (for example, TLCP adherend body) if needed. The plasma treatment is preferably performed at least to an adherend portion of the adhesion target.

Among processes of thermal bonding, thermocompression bonding which involves heating and pressure application is preferable. Where thermocompression bonding is carried out, the process may be performed using, for example, a general heat press, a heating roll press, or a double belting press. In thermocompression bonding, a processing temperature and a pressure may be suitably set according to the adhesion target.

Where the adhesion target is an adhesive, the processing temperature may be from 130 to 250° C., and preferably from 140 to 220° C. The pressure during thermocompression bonding may be, for example, from 0.5 to 10 MPa, and preferably from 1 to 8 MPa.

Where the adhesion target is a TLCP adherend body (preferably a TLCP film), the processing temperature may be from 180 to 350° C., and preferably from 200 to 330° C. The applied pressure during thermocompression bonding may be, for example, from 1 to 10 MPa, and preferably from 2 to 8 MPa.

Where the adhesion target is an adhesive, a further adhesion object (for example, a metal layer, another sheet, a film, or a circuit board) may be adhered to the TLCP molded body (first TLCP molded body) obtained by the first manufacturing process with an adhesive. To adhere the further adhesion object, it may be placed on the first TLCP molded body in an overlapping manner with an adhesive introduced therebetween and be adhered to thereto while forming an adhesion layer. Alternatively, after forming an adhesion layer on the first TLCP molded body, the further adhesion object may be adhered to the adhesion layer.

Second TLCP Molded Body

The second TLCP molded body of the present invention is a TLCP molded body which includes a first TLCP molded body and an adhesion target adhered to an adherend portion of the first TLCP molded body.

In the second TLCP molded body of the present invention, for example, an adhesive may be overlaid on the adherend portion. The adhesive may be a polar adhesive such as an epoxy adhesive and an acrylic adhesive, or a nonpolar adhesive partly having a nonpolar backbone.

Examples of the polar adhesive may include: urea resin adhesives, melamine resin adhesives, phenol resin adhesives, polyvinyl acetate resin adhesives, isocyanate adhesives, epoxy adhesives, unsaturated polyester adhesives, cyanoacrylate adhesives, polyurethane adhesives, acrylic resin adhesives.

Examples of the nonpolar adhesive may include: adhesive compositions comprising a polymer having a nonpolar backbone as a main chain and a well-known adhesive (such as urea resin adhesives, melamine resin adhesives, phenol resin adhesives, polyvinyl acetate resin adhesives, isocyanate adhesives, epoxy adhesives, unsaturated polyester adhesives, cyanoacrylate adhesives, polyurethane adhesives, acrylic resin adhesives) as a mixture, and adhesive compositions each of which comprises a chemical structure in which a nonpolar backbone is introduced to the main polymeric chemical structure of the above-mentioned adhesive.

Where a TLCP film is used as an electronic circuit board material, an adhesive may have the following dielectric characteristics: a relative dielectric constant (ε) of 3.3 or lower and a dielectric dissipation factor (tan δ) of 0.05 or lower at a frequency of 10 GHz. In particular, where the whole substrate is required to have low dielectric characteristics, the adhesive preferably has low dielectric characteristics (i.e., low dielectric adhesive). The adhesive having low dielectric characteristics may have, for example, a relative dielectric constant (ε) of 3.3 or lower and a dielectric dissipation factor (tan δ) of 0.04 or lower (preferably 0.03 or lower) at a frequency of 10 GHz.

Preferable low dielectric adhesives may include: for example, an adhesive composition including an olefin backbone (such as an adhesive composition at least containing an acid-modified crystalline polyolefin and an epoxy resin, an olefinic-backbone-containing modified polyamide adhesive, and an adhesive compositions containing an aromatic olefinic oligomer modifier and an epoxy resin); an adhesive composition including a polyphenylene ether backbone; and other low dielectric adhesives.

For example, the adhesive composition at least containing an acid-modified crystalline polyolefin and an epoxy resin may include an adhesive described in WO 2016/031342; the olefinic-backbone-containing modified polyamide adhesive composition may include an adhesive described in JP 2007-284515 A; the adhesive composition containing an aromatic olefinic oligomer modifier and an epoxy resin may include an adhesive described in JP 2007-63306 A; and the adhesive composition including a polyphenylene ether backbone may include an adhesion layer described in WO 2014/046014. Among these adhesives, for example, in terms of dielectric characteristics, it is more preferred that the adhesive composition at least containing an acid-modified crystalline polyolefin and an epoxy resin contains 5 wt % or more of the acid-modified crystalline polyolefin in the adhesive.

The adhesion layer overlaid on the first TLCP molded body (preferably TLCP film) may be an adhesive sheet or be formed by applying an adhesive composition to the first TLCP molded body (preferably TLCP film) and drying the adhesive composition. The adhesion layer may have a thickness from 1 to 50 μm, preferably from 5 to 40 μm, and more preferably from 10 to 30 μm.

As for the second TLCP molded body of the present invention, the adhesion target may be a TLCP adherend body. For example, the TLCP molded body having a film form according to the present invention may include a TLCP film overlaid on the adherend portion. Alternatively, the TLCP molded body of the present invention may be a laminate in which TLCP films are directly placed with each other. The TLCP film may have a thickness from 10 to 500 μm, preferably from 20 to 200 μm, and more preferably from 25 to 150 μm.

As long as the TLCP adherend body that is an adhesion target comprises at least the thermoplastic liquid crystal polymer, the TLCP adherend body may have a same or different composition as/from that of the plasma-treated TLCP molded body.

Although the TLCP adherend body may be plasma-treated or non-plasma-treated, it is preferable that the plasma treatment is performed to at least a part of an adherend portion of the TLCP adherend body which is adhered to the TLCP molded body in order to improve the adhesion property. In such a case, the TLCP adherend body has, for example, the ratio <C—O>/<COO> of 1.5 or higher and the ratio <C=O>/<COO> of 0.10 or higher in a result of X-ray photoelectron spectroscopy analysis, in the same manner as the first TLCP molded body.

Where TLCP films having a same composition or different compositions from each other are bonded by thermocompression to produce a thermocompression-bonded laminate, it is preferable to place the TLCP films such that the plasma-treated surfaces of the respective films face each other so as to be thermocompression-bonded.

Adhesion strength between a TLCP molded body and an adhesion target may be 7.0 N/cm or higher, preferably 7.5 N/cm or higher, and more preferably 8.0 N/cm or higher. The adhesion strength may refer to initial adhesion strength before PCT as described later or adhesion strength after PCT. The adhesion strength satisfying the above range may be observed between a TLCP film and an adhesive or preferably between a TLCP film and a low dielectric adhesive. Since the low dielectric adhesive as mentioned above includes a nonpolar backbone in order to improve the dielectric characteristics, although it has a lower adhesion property as compared with those of conventional epoxy adhesives, the low dielectric adhesive can exhibit good adhesion to the TLCP film of the present invention as shown in the Examples described later.

The TLCP molded body (in particular, TLCP film) of the present invention on which the adhesion target is overlaid has a good initial adhesion property before PCT. The adhesion property may be evaluated on the basis of adhesion strength determined according to the method described for the Examples below.

A long-term adhesion property may be evaluated on the basis of a retention rate of the adhesion strength after PCT (Pressure Cooker Test) that is a long-term reliability test. As used herein, the term "PCT" refers to an accelerated test in which a sample is retained under a condition of, e.g., 121° C., 100% RH (relative humidity) and 2 atm and is then determined in terms of deterioration of the adhesion strength as compared to the adhesion strength before PCT (initial adhesion strength).

A product preferably has a long service life in a normal condition in which the product is actually used. Therefore, if sufficient adhesion strength is maintained after PCT under the above condition, it can be determined that the product has long service life at ambient temperature and high long-term reliability. For example, as a retention rate of the adhesion strength before and after PCT, the adhesion strength after retainment for 24 hours under a condition of 121° C., 100% RH and 2 atm as PCT (hereinafter, referred to as adhesion strength after PCT) and the adhesion strength before PCT may give a ratio (adhesion strength after PCT/adhesion strength before PCT) of 60% or higher (for example, 70% or higher), preferably 73% or higher, more preferably 75% or higher. The upper limit of the retention rate of the adhesion strength before and after PCT is not particularly limited and may typically be 100% or lower.

In particular, the TLCP molded body having a film form according to the present invention is particularly useful as an electronic circuit board material (such as an insulator of an electronic circuit board, a reinforcing plate of a flexible circuit board, and a cover film of a circuit surface) because the thermoplastic liquid crystal polymer itself has excellent dielectric characteristics, low hygroscopicity, and an improved adhesion property to adhesives and other materials.

Further, where a TLCP film that is a first TLCP molded body may be overlaid with a metal layer to produce a laminate or be formed with a circuit to produce a circuit board, the laminate and the circuit board have high reliability and are preferable because of improved adhesion between the TLCP film and the metal layer or the circuit.

Conductive Part Formation Step

Furthermore, in the present invention, the method of manufacturing the TLCP molded body may further comprise a conductive-part formation step of forming a conductive part (for example, a metal part or a circuit), in addition to the first process or the second process. The conductive-part formation step may be carried out to an unprocessed TLCP molded body prior to the first manufacturing step and/or to an adhesion target in advance. For example, in the conductive part formation step, a conductive part may be formed on the TLCP molded body by thermal bonding, sputtering, vapor deposition, or non-electrolytic plating, etc.

For example, in the conductive-part formation step by thermal bonding, a metal part may be formed by thermally bonding a metal to the TLCP molded body (adherend body, first TLCP molded body, and/or second TLCP molded body) or the adhesion target. Among processes of thermal bonding, thermocompression bonding which involves heating and pressure application is preferably used to bond a metal foil. In this case, the processing temperature may be from 180 to 350° C., and preferably from 200 to 330° C. The pressure during thermocompression bonding may be, for example, from 1 to 10 MPa, and preferably from 2 to 8 MPa.

In the process of sputtering or vapor deposition, a metal part is brought into contact with and is adhered to the adherend portion including at least a part of the plasma-treated portion and/or to the adhesion target by sputtering or vapor depositing a metal. Sputtering and vapor deposition are well-known methods in the field of electronic board manufacture. Metals for sputtering or vapor deposition may include, for example, copper, aluminum, gold, tin, chromium, etc.

In the process of electroless plating, a metal is deposited from a solution containing metal ions and is adhered onto the adherend portion including at least a part of the plasma-treated portion. Electroless plating is a well-known methods in the field of manufacturing of plated product made of non-conductive materials (such as plastics and ceramics). Metals for electroless plating may include, for example, copper, nickel, cobalt, gold, tin, chromium, etc.

The metal layer overlaid by the above processes may be etched to form a circuit as a conductive part, or a circuit may be directly adhered to the adherend portion.

Furthermore, for example, after a circuit is formed on the TLCP film, a cover film may be provided to protect the circuit surface, or a glass/epoxy material or other circuit board may be overlaid on the TLCP film.

The TLCP molded body of the present invention may further comprise a conductive part. For example, the TLCP molded body (first or second TLCP molded body) according to the present invention may comprise a metal part (preferably a metal layer, more preferably a metal foil) on the surface (non-plasma-treated, unprocessed surface and/or plasma-treated surface) of the TLCP molded body, or the TLCP molded body according to the present invention may comprise a metal part on the adhesion target which is adhered to the adherend portion.

Specifically, the TLCP molded body having a film form according to the present invention may include a metal foil overlaid on the adherend portion, alternatively the TLCP molded body of the present invention may be a laminate in which a TLCP film and a metal layer are directly overlaid on one another. The TLCP molded body having a film form according to the present invention may be a laminate in which a metal layer is overlaid on the adhesion target adhered to the adherend portion of the molded body.

A suitable metal may be selected according to the purpose. Preferable metals may include copper, nickel, cobalt, aluminum, gold, tin, chromium, etc. The metal layer has a thickness from 0.01 to 200 μm, preferably from 0.1 to 100 μm, more preferably from 1 to 80 μm, and particularly preferably from 2 to 50 μm.

Where a metal foil is directly overlaid as a metal layer, the metal foil may have a thickness from 1 to 80 μm, and preferably from 2 to 50 μm. The metal foil may have a surface roughness Rz, for example, 2.0 μm or below, and preferably 1.5 μm or below on the side of the metal foil which is brought into contact with the first TLCP molded body. The lower limit of the surface roughness Rz may be, for example, 0.8 μm. The surface roughness Rz refers to a ten-point average roughness determined in accordance with JIS B 0601-1994.

For example, the TLCP molded body (first or second TLCP molded body) according to the present invention may comprise a circuit on the surface (non-plasma-treated, unprocessed surface and/or plasma-treated surface) of the TLCP molded body or on the adhesion target adhered to the adherend portion of the TLCP molded body.

EXAMPLE

Hereinafter, the present invention will be described in more detail with reference to the Examples. However, the present invention will not be limited by the Examples whatsoever. In the Examples and Comparative Examples below, various physical properties were determined in the following manner.

<C—O>, <C=O>, and <COO>

As for the surface of an adherend portion of each of the TLCP films prepared in the Examples and Comparative Examples, each of the proportions of peak areas <C—O>, <C=O>, and <COO> was determined using a scanning X-ray photoelectron spectrometer ("PHI Quantera SXM" manufactured by ULVAC-PHI, Inc.) under the following measurement conditions. Then, a sum of the proportions of peak areas (<C—O>+<C=O>+<COO>) as well as ratios of the proportions of the peak areas (<C—O>/<COO> and <C=O>/<COO>) were calculated. To calculate the sum and ratios, each of the proportions of the peak areas was calculated as a proportion of a peak area of [C—O bond], [C=O bond], or [COO bond] based on a total peak area of respective peaks of C(1s) observed for the respective bonding states.

X-ray source: monochromatic AlKα (1486.6 eV)
X-ray beam diameter: 100 μm φ (25 W, 15 kV)
Measurement range: 1000 μm (width)×300 μm (height)
Signal capturing angle: 45°
Charge neutralization condition: neutralization electron gun, Ar$^+$ ion gun
Vacuum degree: 1×10$^{-6}$ Pa or lower Adhesion Strength A laminate including a TLCP film prepared in each of the Examples and Comparative Examples and an adhesion target was prepared as a sample for evaluation. To evaluate long-term reliability of the adhesion property, PCT (Pressure Cooker Test) was carried out by retaining the sample under a condition of 121° C. and 100% RH for 24 hours. Before and after the PCT treatment, 1.0-cm wide peeling test pieces were prepared from the laminate of each sample for evaluation. The film layer of each test piece was adhered to a flat plate with a double-faced adhesive tape, and the strength observed upon peeling at the interface between the adhesion target and the TLCP film at a rate of 50 mm/min was determined in accordance with JIS C 6471, 90°-method. Adhesion strength of each test piece was determined before PCT and after 24-hour PCT.

Example 1

A TLCP film ("Vecstar" manufactured by KURARAY CO., LTD.; 50-μm thick) was prepared and was set in a continuous plasma processor equipped with a film unwinder and a film winder inside a vacuum chamber such that the film was passed between parallel plate electrodes (electrode surface area: 5 cm×60 cm; distance between the head and the film: 5 mm) (direct process). After evacuating the vacuum chamber using a vacuum pump, N$_2$ and O$_2$ were introduced, and the vacuum degree inside the vacuum chamber was adjusted to 3 Pa. With the processing mode set to direct plasma mode (DP), plasma was generated between the electrodes in a continuous discharge mode of applying a voltage having a continuous waveform at a discharge frequency of 150 kHz with a power of 1 kW (output 3.3 W/cm$^2$) while the film was wound at a rate of 3 m/min so as to continuously perform plasma treatment to the surface of the TLCP film. Table 7 shows the proportions <C—O>, <C=O>, and <COO>, as well as the sum and ratios thereof calculated from the result of X-ray photoelectron spectroscopy analysis of the surface of the adherend portion of the plasma-treated TLCP film.

Then, the plasma-treated TLCP film was overlaid with a low dielectric adhesive sheet ("NIKAFLEX SAFY" manufactured by NIKKAN INDUSTRIES Co., Ltd.; 25-μm thick, relative dielectric constant of 3.0, dielectric dissipation factor of 0.005) and was subjected to heat pressing for 40 minutes under a condition of 160° C. and 4 MPa so as to produce a laminate of the thermoplastic liquid crystal polymer and the adhesive sheet. Table 7 shows the adhesion strength of the laminate before and after PCT.

Example 2

A TLCP film ("Vecstar" manufactured by KURARAY CO., LTD.; 50-μm thick) was prepared and was set in a continuous plasma processor equipped with a film unwinder and a film winder such that the film was passed between parallel plate electrodes (electrode surface area: 2.4 cm×64 cm; distance between the head and the film: 5 mm) (direct process). N$_2$ and O$_2$ were introduced as gas species. With the processing mode set to direct plasma mode (DP), plasma was generated between the electrodes in a pulse discharge mode of applying a voltage having a pulse-like waveform at a discharge frequency of 40 kHz with a power of 0.8 kW (output 5.2 W/cm$^2$) while the film was wound at a rate of 3 m/min so as to continuously perform plasma treatment to the surface of the TLCP film. Table 7 shows the proportions <C—O>, <C=O>, and <COO>, as well as the sum and ratios thereof calculated from the result of X-ray photoelectron spectroscopy analysis of the surface of the adherend portion of the plasma-treated TLCP film.

Then, the plasma-treated TLCP film was overlaid with a low dielectric adhesive sheet ("NIKAFLEX SAFY" manufactured by NIKKAN INDUSTRIES Co., Ltd.; 25-μm thick, relative dielectric constant of 3.0, dielectric dissipation factor of 0.005) and was subjected to heat pressing for 40 minutes under a condition of 160° C. and 4 MPa so as to produce a laminate of the thermoplastic liquid crystal polymer and the adhesive sheet. Table 7 shows the adhesion strength of the laminate before and after PCT.

Example 3

Example 3 was prepared in the same manner as Example 1, except that $N_2$, $O_2$ and $H_2O$ were used as the gas species. Table 7 shows the proportions <C—O>, <C=O>, and <COO>, the sum and ratios thereof calculated from the result of X-ray photoelectron spectroscopy analysis of the surface of the adherend portion of the plasma-treated TLCP film, as well as the adhesion strength of the laminate of the thermoplastic liquid crystal polymer and the low dielectric adhesive sheet before and after PCT.

Example 4

Example 4 was prepared in the same manner as Example 2, except that $N_2$, $O_2$ and $H_2O$ were used as the gas species. Table 7 shows the proportions <C—O>, <C=O>, and <COO>, the sum and ratios thereof calculated from the result of X-ray photoelectron spectroscopy analysis of the surface of the adherend portion of the plasma-treated TLCP film, as well as the adhesion strength of the laminate of the thermoplastic liquid crystal polymer and the low dielectric adhesive sheet before and after PCT.

Example 5

Example 5 was prepared in the same manner as Example 2, except that $N_2$ was used as the gas species. Table 7 shows the proportions <C—O>, <C=O>, and <COO>, the sum and ratios thereof calculated from the result of X-ray photoelectron spectroscopy analysis of the surface of the adherend portion of the plasma-treated TLCP film, as well as the adhesion strength of the laminate of the thermoplastic liquid crystal polymer and the low dielectric adhesive sheet before and after PCT.

Example 6

Example 6 was prepared in the same manner as Example 1, except that $H_2O$ was used as the gas species. Table 7 shows the proportions <C—O>, <C=O>, and <COO>, the sum and ratios thereof calculated from the result of X-ray photoelectron spectroscopy analysis of the surface of the adherend portion of the plasma-treated TLCP film, as well as the adhesion strength of the laminate of the thermoplastic liquid crystal polymer and the low dielectric adhesive sheet before and after PCT.

Example 7

A plasma-treated TLCP film was prepared in the same manner as Example 4 and was overlaid with an epoxy adhesive sheet ("NIKAFLEX SAF" manufactured by NIKKAN INDUSTRIES Co., Ltd.; 25-μm thick, relative dielectric constant of 3.0, dielectric dissipation factor of 0.05), followed by heat pressing for 40 minutes under a condition of 160° C. and 4 MPa so as to produce a laminate of the thermoplastic liquid crystal polymer and the adhesive sheet. Table 7 shows the adhesion strength of the laminate before and after PCT.

Example 8

Two plasma-treated TLCP films were prepared in the same manner as Example 1 and were overlaid with each other such that the plasma-treated surfaces of the films were mutually brought into contact as adherend surfaces, followed by heat pressing for 10 minutes under a condition of 300° C. and 4 MPa so as to produce a laminate of the thermoplastic liquid crystal polymer films. Table 7 shows the adhesion strength of the laminate before and after PCT.

Example 9

Two plasma-treated TLCP films were prepared in the same manner as Example 4 and were overlaid with each other such that the plasma-treated surfaces of the films were mutually brought into contact as adherend surfaces, followed by heat pressing for 10 minutes under a condition of 300° C. and 4 MPa so as to produce a laminate of the thermoplastic liquid crystal polymer films. Table 7 shows the adhesion strength of the laminate before and after PCT.

Example 10

Example 10 was prepared in the same manner as Example 1, except that Ar was used as the gas species. Table 7 shows the proportions <C—O>, <C=O>, and <COO>, the sums and ratios thereof calculated from the results of X-ray photoelectron spectroscopy analysis of the surface of the adherend portion of the plasma-treated TLCP film, as well as the adhesion strength of the laminate of the thermoplastic liquid crystal polymer and the low dielectric adhesive sheet before and after PCT.

Comparative Example 1

A TLCP film ("Vecstar" manufactured by KURARAY CO., LTD.; 50-μm thick) was prepared and was overlaid with a low dielectric adhesive sheet ("NIKAFLEX SAFY" manufactured by NIKKAN INDUSTRIES Co., Ltd.; 25-μm thick, relative dielectric constant of 3.0, dielectric dissipation factor of 0.005), followed by heat pressing for 40 minutes under a condition of 160° C. and 4 MPa so as to produce a laminate of the thermoplastic liquid crystal polymer and the adhesive sheet. Table 7 shows the proportions <C—O>, <C=O>, and <COO>, the sum and ratios thereof calculated from the result of X-ray photoelectron spectroscopy analysis of the surface of the adherend portion of the untreated TLCP film, as well as the adhesion strength of the laminate before and after PCT.

Comparative Example 2

A TLCP film ("Vecstar" manufactured by KURARAY CO., LTD.; 50-μm thick) was prepared and was overlaid with an epoxy adhesive sheet ("NIKAFLEX SAF" manufactured by NIKKAN INDUSTRIES Co., Ltd.; 25-μm thick, relative dielectric constant of 3.0, dielectric dissipation factor of 0.05), followed by heat pressing for 40 minutes under a condition of 160° C. and 4 MPa so as to produce a laminate of the thermoplastic liquid crystal polymer and the adhesive sheet. Table 7 shows the adhesion strength of the laminate before and after PCT.

Comparative Example 3

Two TLCP films ("Vecstar" manufactured by KURARAY CO., LTD.; 50-μm thick) were prepared and were overlaid with each other, followed by heat pressing for 10 minutes under a condition of 300° C. and 4 MPa so as to produce a laminate of the thermoplastic liquid crystal polymer films. Table 7 shows the adhesion strength of the laminate before and after PCT.

Comparative Example 4

A TLCP film ("Vecstar" manufactured by KURARAY CO., LTD.; 50-μm thick) was prepared and was set in a continuous plasma processor equipped with a film unwinder and a film winder. $N_2$ and $O_2$ were introduced as gas species. Plasma was generated between parallel plate electrodes (electrode surface area: 5 cm×60 cm; distance between the head and the film: 4 mm) by a discharge process of applying a voltage having a pulse-like waveform at a discharge frequency of 40 kHz with a power of 1.5 kW (output 5.0 W/cm²) while the film was wound at a rate of 3 m/min so as to blow the plasma generated between the electrodes to the film to continuously perform plasma treatment to the surface of the TLCP film (remote process). Table 7 shows the proportions <C—O>, <C=O>, and <COO>, as well as the sum and ratios thereof calculated from the result of X-ray photoelectron spectroscopy analysis of the surface of the adherend portion of the plasma-treated TLCP film.

Then, the plasma-treated TLCP film was overlaid with a low dielectric adhesive sheet ("NIKAFLEX SAFY" manufactured by NIKKAN INDUSTRIES Co., Ltd.; 25-μm thick, relative dielectric constant of 3.0, dielectric dissipation factor of 0.005) and was subjected to heat pressing for 40 minutes under a condition of 160° C. and 4 MPa so as to produce a laminate of the thermoplastic liquid crystal polymer and the adhesive sheet. Table 7 shows the adhesion strength of the laminate before and after PCT.

Comparative Example 5

A plasma-treated TLCP film was prepared in the same manner as Example 4 and was overlaid with an epoxy adhesive sheet ("NIKAFLEX SAF" manufactured by NIKKAN INDUSTRIES Co., Ltd.; 25-μm thick, relative dielectric constant of 3.0, dielectric dissipation factor of 0.05), followed by heat pressing for 40 minutes under a condition of 160° C. and 4 MPa so as to produce a laminate of the thermoplastic liquid crystal polymer and the adhesive sheet. Table 7 shows the adhesion strength of the laminate before and after PCT.

Comparative Example 6

Comparative Example 6 was prepared in the same manner as Example 4, except that the output was changed to 2.0 W/cm². Table 7 shows the proportions <C—O>, <C=O>, and <COO>, the sums and ratios thereof calculated from the results of X-ray photoelectron spectroscopy analysis of the surface of the adherend portion of the plasma-treated TLCP film, as well as the adhesion strength of the laminate of the thermoplastic liquid crystal polymer and the low dielectric adhesive sheet before and after PCT.

TABLE 7

| | Plasma treatment condition | | | | | | | TLCP film | | | | | |
|---|---|---|---|---|---|---|---|---|---|---|---|---|---|
| | Pressure condition | Treat. system | Process mode | Gas Species | Discharge mode | Freq. (kHz) | Output (W/cm²) | Time (s) | <C—O> (%) | <C=O> (%) | <COO> (%) | <C—O>/<COO> | <C=O>/<COO> | <C—O> + <C=O> + <COO> (%) |
| Ex. 1 | Vac. | Direct | DP | $N_2 + O_2$ | Cont. | 150 | 3.3 | 1.0 | 23.9 | 5.4 | 10.9 | 2.2 | 0.50 | 40.2 |
| Ex. 2 | Atm. | Direct | DP | $N_2 + O_2$ | Pulse | 40 | 5.2 | 0.5 | 19.0 | 4.8 | 9.5 | 2.0 | 0.51 | 33.3 |
| Ex. 3 | Vac. | Direct | DP | $N_2 + O_2 + H_2O$ | Cont. | 150 | 3.3 | 1.0 | 24.1 | 5.7 | 10.9 | 2.2 | 0.52 | 40.7 |
| Ex. 4 | Atm. | Direct | DP | $N_2 + O_2 + H_2O$ | Pulse | 40 | 5.2 | 0.5 | 19.0 | 5.4 | 9.5 | 2.0 | 0.57 | 33.9 |
| Ex. 5 | Atm. | Direct | DP | $N_2$ | Pulse | 40 | 5.2 | 0.5 | 19.4 | 4.6 | 9.3 | 2.1 | 0.50 | 33.3 |
| Ex. 6 | Vac. | Direct | DP | $H_2O$ | Cont. | 150 | 3.3 | 1.0 | 24.1 | 1.7 | 12.1 | 2.0 | 0.14 | 37.9 |
| Ex. 7 | Atm. | Direct | DP | $N_2 + O_2 + H_2O$ | Pulse | 40 | 5.2 | 0.5 | 19.0 | 5.4 | 9.5 | 2.0 | 0.57 | 33.9 |
| Ex. 8 | Vac. | Direct | DP | $N_2 + O_2$ | Cont. | 150 | 3.3 | 1.0 | 23.9 | 5.4 | 10.9 | 2.2 | 0.50 | 40.2 |
| Ex. 9 | Atm. | Direct | DP | $N_2 + O_2 + H_2O$ | Pulse | 40 | 5.2 | 0.5 | 19.0 | 5.4 | 9.5 | 2.0 | 0.57 | 33.9 |
| Ex. 10 | Vac. | Direct | DP | AT | Cont. | 150 | 3.3 | 1.0 | 21.5 | 1.3 | 13.5 | 1.6 | 0.10 | 36.3 |
| Com. Ex. 1 | | | | Untreated | | | | | 11.9 | 0 | 8.1 | 1.5 | 0 | 20.0 |
| Com. Ex. 2 | | | | Untreated | | | | | 11.9 | 0 | 8.1 | 1.5 | 0 | 20.0 |
| Com. Ex. 3 | | | | Untreated | | | | | 11.9 | 0 | 8.1 | 1.5 | 0 | 20.0 |
| Com. Ex. 4 | Atm. | Remote | — | $N_2 + O_2$ | Pulse | 40 | 5.0 | 1.0 | 15.2 | 0 | 10.9 | 1.4 | 0 | 26.1 |
| Com. Ex. 5 | Atm. | Remote | — | $N_2 + O_2$ | Pulse | 40 | 5.0 | 1.0 | 15.2 | 0 | 10.9 | 1.4 | 0 | 26.1 |
| Com. Ex. 6 | Atm. | Direct | DP | $N_2 + O_2 + H_2O$ | Pulse | 40 | 2.0 | 0.5 | 17.5 | 3.0 | 13.5 | 1.3 | 0.22 | 34.0 |

TABLE 7-continued

| | | Laminate | | | |
|---|---|---|---|---|---|
| | | Adhesion target | Adhesion strength before PCT (N/cm) | Adhesion strength after PCT (N/cm) | Retention rate of adhesion strength before and after PCT |
| | Ex. 1 | Low diel. adh. | 12.0 | 11.0 | 92% |
| | Ex. 2 | Low diel. adh. | 9.5 | 8.0 | 84% |
| | Ex. 3 | Low diel. adh. | 13.0 | 13.0 | 100% |
| | Ex. 4 | Low diel. adh. | 10.6 | 8.0 | 75% |
| | Ex. 5 | Low diel. adh. | 7.5 | 6.5 | 87% |
| | Ex. 6 | Low diel. adh. | 12.0 | 11.0 | 92% |
| | Ex. 7 | Epoxy adh. | 12.0 | 10.0 | 83% |
| | Ex. 8 | TLCP film | 13.0 | 10.3 | 79% |
| | Ex. 9 | TLCP film | 9.8 | 7.0 | 71% |
| | Ex. 10 | Low diel. adh. | 10.0 | 6.0 | 60% |
| | Com. Ex. 1 | Low diel. adh. | 4.5 | 2.0 | 44% |
| | Com. Ex. 2 | Epoxy adh. | 6.0 | 2.0 | 33% |
| | Com. Ex. 3 | TLCP film | 6.0 | 5.0 | 83% |
| | Com. Ex. 4 | Low diel. adh. | 5.0 | 2.0 | 40% |
| | Com. Ex. 5 | Epoxy adh. | 7.5 | 5.0 | 67% |
| | Com. Ex. 6 | Low diel. adh. | 6.0 | 4.0 | 67% |

With reference to Table 7, first of all, as can be seen from the results of plasma-untreated Comparative Examples 1 to 3, the untreated TLCP films had different adhesion properties depending on the types of the adhesion targets. The low dielectric adhesive (Comparative Example 1) had poor adhesion strength to the TLCP film, as compared to the epoxy adhesive (Comparative Example 2).

Comparative Examples 4 and 5, which were subjected to the plasma treatment in the remote system, had an increased sum of <C—O>, <C=O>, and <COO> on the surfaces of the adherend portions of the plasma-treated TLCP films as compared with those of Comparative Examples 1 and 2, which were the untreated TLCP films, Comparative Examples 4 and 5 had the ratio <C—O>/<COO> of 1.4 and the ratio <C=O>/<C00> of 0.

As for Comparative Example 5 with the epoxy adhesive, although Comparative Example 5 had greater adhesion before and after PCT as compared to that of the untreated TLCP film (Comparative Example 2), the adhesion strength after PCT was not sufficient. As for Comparative Example 4 with the low dielectric adhesive, although Comparative Example 4 had slightly greater adhesion to the low dielectric adhesive before PCT as compared to that of the untreated TLCP film (Comparative Example 1), Comparative Example 4 had insufficient adhesion strength both before and after PCT in comparison with that of the epoxy adhesive, and had poor adhesion strength in comparison with that of Comparative Example 5 with the epoxy adhesive.

In Comparative Example 6, although the direct plasma treatment was carried out, Comparative Example 6 had the ratio <C—O>/<COO> of 1.3 on the surface of the adherend portion of the plasma-treated TLCP film because the plasma treatment was carried out at an output of 2.0 W/cm$^2$, which was lower than 2.5 W/cm$^2$ as required by the present invention. Therefore, Comparative Example 6 had poor adhesion strength between the TLCP film and the low dielectric adhesive both before and after PCT and showed a considerable decrease in the adhesion strength after PCT.

In contrast, Examples 1 to 6 and 10 all had the ratios <C—O>/<COO> of 1.5 or higher and the ratios <C=O>/<COO> of 0.10 or higher because the direct plasma treatments were carried out at outputs of 2.5 W/cm$^2$ or higher for a processing times shorter than 5 seconds. Thus, even where the low dielectric adhesive was used, they had 1.6 or more times higher adhesion strength before PCT and 3 or more times higher adhesion strength after PCT than those of Comparative Example 1.

In comparison of the respective Examples, Examples 3 and 6, in which the vacuum plasma treatment was carried out in the same manner as Example 1 with the gas species changed to $N_2$, $O_2$ and $H_2O$ and to $H_2O$, respectively, had the ratio <C—O>/<COO> of 1.8 or higher, the ratio <C=O>/<COO> of 0.12 or higher, and the sum of <C—O>, <C=O>, and <COO> equal to or higher than 37%. Presumably because of that, Example 3 and Example 6 had extremely high adhesion strength between the TLCP films and the low dielectric adhesives both before and after PCT.

Example 10, in which the vacuum plasma treatment was carried out in the same manner as Example 1 with the gas species changed to Ar, had the ratio <C—O>/<COO> of 1.6 or higher, the ratio <C=O>/<COO> of 0.10 or higher, and the sum of <C—O>, <C=O>, and <COO> equal to or higher than 36%. Presumably because of that, Example 10 had extremely high initial adhesion strength between the TLCP film and the low dielectric adhesive.

Example 2 achieved the respective ratios of the peak intensities within the specific ranges because the plasma treatment was performed at an extremely high output of 5.2 W/cm² for a short processing time of 0.5 second. Thus, Example 2 had high adhesion strength between the TLCP film and the low dielectric adhesive both before and after PCT. Further, Examples 4 and 5, in which the gas species of Example 2 were changed, also achieved the respective ratios of the peak intensities within the specific ranges. Thus, Examples 4 and 5 exhibited high adhesion strength between the TLCP films and the low dielectric adhesives both before and after PCT.

Moreover, the plasma-treated TLCP film in the same manner as Example 4 even had high adhesion strength between the conventional epoxy adhesive and the TLCP film both before and after PCT and thus had improved adhesion to various types of adhesives (Example 7).

Both of Example 8 and Example 9, in which the plasma treatment was carried out in the same manner as Example 1 and Example 4, respectively, followed by thermocompression bonding of the TLCP films, exhibited high adhesion strength both before and after PCT as compared to that of the thermocompression-bonded untreated TLCP films (Comparative Example 3).

In particular, Examples 1 to 6 could maintain adhesion strength after PCT at an extremely high level even where the low dielectric adhesive was used, and Examples 1 to 6 had adhesion strength before PCT of 7.5 N/cm or higher and adhesion strength after PCT of 6.5 N/cm or higher. They all had the retention rates of the adhesion strength before and after PCT of 70% or higher.

For example, in comparison of Comparative Example 1 (untreated TLCP film) and Comparative Example 4 (which involves the remote plasma treatment), these Comparative Examples showed considerable decrease in the adhesion strength after PCT (to 2.0 N/cm) where the low dielectric adhesive was used. In contrast, Examples 1 to 6 all exhibited 1.5 or more times higher adhesion strength before PCT and 3 or more times higher adhesion strength after PCT than those of Comparative Examples 1 and 4.

The plasma treatment of the present invention could enhance the adhesion strength of the TLCP film even to an epoxy adhesive. Example 7 had the adhesion strength before PCT of 12.0 N/cm and the adhesion strength after PCT of 10.0 N/cm. Example 7 had a retention rate of the adhesion strength before and after PCT of 80% or higher.

Example 7 had 2 times higher adhesion strength before PCT and 5 times higher adhesion strength after PCT than those of Comparative Example 2, which represented the untreated TLCP film. Even when compared to Comparative Example 5, which involved the plasma treatment, Example 7 had 1.6 times higher adhesion strength before PCT and two times higher adhesion strength after PCT than those of Comparative Example 5.

The plasma treatment of the present invention could enhance adhesion strength even between thermocompression-bonded TLCP films, as compared to untreated TLCP films. Examples 8 and 9 showed the adhesion strength before PCT of 9.8 N/cm or higher and the adhesion strength after PCT of 7.0 N/cm or higher. The retention rates of the adhesion strength before and after PCT were equal to or higher than 70%.

Examples 8 and 9 had 1.5 or more times higher adhesion strength before PCT and 1.4 or more times higher adhesion strength after PCT than those of the Comparative Example 3, which represented the untreated TLCP film.

Further, the TLCP films prepared in Examples 1 and 4 were allowed to stand at room temperature for 2 months after the plasma treatment without being adhered to an adhesive, and then the peak intensities of <C—O>, <C=O>, and <COO> of the films were calculated again (Table 8). Each of the TLCP films of Examples 1 and 4 after 2 months of storage was overlaid with a low dielectric adhesive sheet ("NIKAFLEX SAFY" manufactured by NIKKAN INDUSTRIES Co., Ltd.; 25-nm thick, relative dielectric constant of 3.0, dielectric dissipation factor of 0.005), followed by heat pressing for 40 minutes under a condition of 160° C. and 4 MPa so as to produce a laminate of the thermoplastic liquid crystal polymer and the adhesive sheet. Table 8 shows the adhesion strength of the layered bodies before and after PCT.

TABLE 8

| | | Plasma treatment condition | | | | | | | TLCP film | | | | | |
| --- | --- | --- | --- | --- | --- | --- | --- | --- | --- | --- | --- | --- | --- | --- |
| | | Pressure cond. | Treat. process | Process mode | Gas species | Disch. process | Freq. (kHz) | Output (W/cm²) | Time (s) | <C—O> (%) | <C=O> (%) | <COO> (%) | <C—O> <COO> | <C=O> <COO> | <C—O> + <C=O> + <COO> (%) |
| Ex. 1 | Immed. after treatment | Vacuum | Direct | DP | N₂ + O₂ | Cont. | 150 | 3.3 | 1.0 | 23.9 | 5.4 | 10.9 | 2.2 | 0.50 | 40.2 |
| | After 2 months | | | | | | | | | 24.5 | 5.4 | 11.6 | 2.1 | 0.46 | 41.5 |
| Ex. 4 | Immed. after treatment | Atm | Direct | DP | N₂ + O₂ + H₂O | Pulse | 40 | 5.2 | 0.5 | 19.0 | 5.4 | 9.5 | 2.0 | 0.57 | 33.9 |
| | After 2 months | | | | | | | | | 19.0 | 5.4 | 9.5 | 2.0 | 0.57 | 33.9 |

TABLE 8-continued

|  | Laminate | | |
| --- | --- | --- | --- |
| Adhesion target | Adhesion strength before PCT (N/cm) | Adhesion strength after PCT (N/cm) | Retention rate of adhesion strength before/after PCT |
| Low diel. adh. | 12.0 | 11.0 | 92% |
| Low diel. adh. | 10.0 | 9.0 | 90% |
| Low diel. adh. | 10.6 | 8.0 | 75% |
| Low diel. adh. | 10.0 | 8.0 | 80% |

The TLCP films of the present invention did not show substantial change in the chemical bonding state of the treated surfaces and had the respective ratios of the peak intensities within the specific ranges, even after the long-term storage of 2 months without being adhered after the plasma treatment. Thus, Examples 1 and 4 could maintain the adhesion strength to the low dielectric adhesive within a favorable range even after 2 months of storage. Examples 1 and 4 after 2 months of storage had the adhesion strength before PCT of 7.5 N/cm or higher and the adhesion strength after PCT of 6.5 N/cm or higher. Examples 1 and 4 after 2 months of storage both had the retention rates of the adhesion strength before and after PCT of 70% or higher.

INDUSTRIAL APPLICABILITY

Since the TLCP molded body of the present invention could be applied to various applications in accordance with the form thanks to the improved adhesion property of the thermoplastic liquid crystal polymer and is particularly useful in applications such as multilayer circuit boards, insulators of electronic circuit boards, reinforcing plates of flexible circuit boards, cover films for circuit surfaces, and multilayer circuits with adhesives.

Although the present invention has been described in terms of the preferred Examples thereof, those skilled in the art would readily arrive at various changes and modifications in view of the present specification without departing from the scope of the invention. Accordingly, such changes and modifications are included within the scope of the present invention defined by the appended claims.

What is claimed is:

1. A thermoplastic liquid crystal polymer molded body comprising a thermoplastic polymer capable of forming an optically anisotropic melt phase (hereafter referred to as a thermoplastic liquid crystal polymer or TLCP), wherein
   the TLCP molded body includes an adherend portion in at least a part of the TLCP molded body, and
   the adherend portion has a surface satisfying:
      a ratio of <C—O> relative to <COO> (<C—O>/<COO>) of 1.5 or higher and 3.0 or lower in which the <C—O> represents a proportion of a peak area of [C—O bond] based on a C(1s) peak area, and the <COO> represents a proportion of a peak area of [COO bond] based on the C(1s) peak area;
      a ratio of <C—O> relative to <COO> (<C—O>/<COO>) of 0.10 or higher and 0.70 or lower in which the <C=O> represents a proportion of a peak area of [C=O bond] based on the C(1s) peak area, and the <COO> represents the proportion of the peak area of the [COO bond] based on the C(1s) peak area; and
      the <C—O> is from 19.0 to 30.0% in a result of X-ray photoelectron spectroscopy analysis of the surface of the adherend portion.

2. The TLCP molded body according to claim 1, wherein the TLCP molded body is shaped in a film form.

3. The TLCP molded body according to claim 1, further comprising an adhesion target, wherein the adhesion target is adhered to the adherend portion.

4. The TLCP molded body according to claim 3, wherein the adhesion target is an adhesive.

5. The TLCP molded body according to claim 4, wherein the adhesive has a relative dielectric constant (ε) of 3.3 or lower and a dielectric dissipation factor (tan δ) of 0.04 or lower at a frequency of 10 GHz.

6. The TLCP molded body according to claim 3, wherein the adhesion target is a TLCP adherend body.

7. The TLCP molded body according to claim 3, wherein adhesion strength between the TLCP molded body and the adhesion target is 7.0 N/cm or higher.

8. The TLCP molded body according to claim 3, comprising a metal part as the adhesion target.

9. The TLCP molded body according to claim 3, comprising a circuit as the adhesion target.

10. The TLCP molded body according to claim 1, wherein the ratio <C—O>/<COO> is 1.7 or higher.

11. The TLCP molded body according to claim 1, wherein the ratio <C—O>/<COO> is 2.2 or lower.

12. The TLCP molded body according to claim 1, wherein the <COO> is from 8.0 to 15.0%.

13. A method of manufacturing the TLCP molded body as recited in claim 1, the method comprising a surface treatment step of performing plasma treatment to at least a part of a surface of the TLCP molded body, wherein
   the plasma treatment is performed in a direct system at an output of 2.5 W/cm² or higher for a processing time shorter than 5 seconds to give a plasma-treated portion.

14. The method according to claim 13, wherein a gas species in the plasma treatment includes at least a nitrogen-containing gas and/or an oxygen-containing gas.

15. The method according to claim 13, further comprising at least an adhesion step of adhering an adhesion target to an adherend portion including at least a part of the plasma-treated portion.

16. The method according to claim 13, wherein the processing time is 4 seconds or shorter.

17. The method according to claim 13, wherein the output is 8.0 W/cm² or lower.

18. The method according to claim 13, wherein the surface treatment step is carried out by roll-to-roll processing.

* * * * *